350-96.26 SR
XR 3,868,514
SEARCH ROOM

United States Patent [19]
Israelsson
SUBSTITUTE FOR MISSING XR
[11] 3,868,514
[45] Feb. 25, 1975

[54] HANDHELD READING DEVICE

[75] Inventor: Rolf B. E. Israelsson, Solna, Sweden

[73] Assignee: Svenska Dataregister AB, Solna, Sweden

[22] Filed: Sept. 24, 1973

[21] Appl. No.: 399,971

[30] Foreign Application Priority Data
Oct. 19, 1972 Sweden ............................ 13501/72

[52] U.S. Cl. .......... 250/566, 235/61.11 E, 250/227, 250/237, 250/239, 250/569
[51] Int. Cl. ...... G01n 21/30, G02b 5/14, G06k 7/00
[58] Field of Search ...... 235/61.11 E; 250/227, 202, 250/239, 237, 569, 566

[56] References Cited
UNITED STATES PATENTS
2,688,099 8/1954 Bickley .............................. 250/237
3,509,353 4/1970 Sundblad et al. ............... 250/239 X
3,673,416 6/1972 Berler ................................ 250/569

*Primary Examiner*—James W. Lawrence
*Assistant Examiner*—T. N. Grigsby
*Attorney, Agent, or Firm*—Norman Friedman; Robert F. Rotella; Stephen A. Roen

[57] ABSTRACT

A lensless handheld reading pen utilizes a fiber optic system in conjunction with a light source to illuminate an area on a label containing the markings to be read. Light reflected from the label enters the pen through a series of apertures which are dimensioned to permit the maximum amount of light to enter and reach a photoelement while at the same time eliminating internal reflections within the pen cavity from being sensed by the photoelement.

11 Claims, 3 Drawing Figures

HANDHELD READING DEVICE

The present invention relates to a handheld reading device for reading markings on data records, the device being described in the introduction to claim 1.

Different handheld reading devices have been used for some years now within the retail business. These reading devices read markings on price labels and similar data records and the markings constitute codes characteristic for the different articles. The codes are optically or magnetically readable, and for certain purposes optically readable codes have been found to be the most suitable mainly because the price labels then can be produced by means of conventional, inexpensive printing processes.

Optical reading devices are described in U.S. Pat. Nos. 2,420,716, 2,933,612, 3,130,317, 3,238,501, 3,417,234 and 3,509,353, French Pat. No. 2,022,232 and Swedish published patent applications Nos. 9457/71 and 152/72, for instance.

Some of these reading devices, such as those according to U.S. Pat. Nos. 2,933,612, 3,130,317 and 3,238,501, French Pat. No. 2,022,232 and Swedish published patent applications Nos. 9457/71 and 152/72, must be provided with optical lenses in order to function. These lenses focus the light reflected from a data record either on a light receiving means or to a spot at a predetermined distance from said means. Disadvantages with the focusing of light are, for instance, that a careful adjustment of the focusing lens is necessary in order that the focal length thereof shall be equal to the distance between the lens and the light receiving means or be equal to the distance between the lens and the data record or be a fraction of any of said distances. Moreover, a certain amount of light is lost when it enters into, passes through and leaves lenses. This is a considerable disadvantage because the quantity of light which is reflected by the data record to the light receiving means within the reading device is so small that a further reduction thereof would jeopardize the function of the device. In addition to these two disadvantages the use of lenses requires that the reading device be maintained at a fixed angle to the data record and that a transparent sheet, such as a plastic sheeting protecting the markings on the data record, cannot be introduced between the reading device and the data record because the reading spot on the data record will then not coincide with the focal point of the lens. Moreover, the costs for the reading device and its assembly will increase.

It is true that U.S. Pat. Nos. 2,420,716, 3,417,234 and 3,509,353 do not show any lenses between the light transmitting opening of the casing and the light sensitive element therein but light transmitting means between said opening and said element are necessary in order that the device shall function satisfactory. The light transmitting means consist of so called light rods or fibers which certainly transmit light to the intended place, but the quantity of light which is lost when light enters into, passes through and leaves the fibers is so great that the quantity of light reaching the light sensitive element in certain cases is insufficient. Moreover, the light receiving ends have bad resolution since each such end receives light reflected from the data record within an angle of approximately 64° around the center axis of the fiber. This means that the reading device cannot be inclined considerably in relation to the data record and that any transparent material cannot be introduced between the data record and the reading device without the reading area or spot becoming greater and/or irregular which jeopardizes the accuracy of the reading. It is true that FIG. 1 according to U.S. Pat. No. 3,417,234 does not show any light transmitting means between the opening of the casing and the light sensitive means but the light which is received by these means not only consists of light reflected from discrete areas on the data record but also includes light from other areas on and around the data record, i.e., the resolution of the reading device is very bad. Moreover, none of the last mentioned U.S. patents shows any aperture between the opening of the casing contacting the data record and the light receiving means.

The reading device according to the present invention removes the disadvantages with previously known reading devices. Thus, the present device has a very simple construction because it includes a relatively small number of components, is easy to assemble and disassemble, prevents undesireable reflections from reaching the light receiving means and, especially, picks up a great quantity of light reflected from data records with a very good resolution, which means that it can be inclined considerably in relation to a data record and can be situated at a distance from the data record without the correct reading being jeopardized.

The invention will be better understood from the following detailed description of a preferred embodiment thereof in connection with the drawings in which.

The reading device according to the invention is in the form of an ink pen and is somewhat bigger than such a pen. It is intended for optical reading of price labels which may be the labels shown in British Pat. No. 1,252,528, for instance. It can, during the reading, or scanning, be in contact with the label or can be at a distance from the label. It can also be inclined considerably in relation to the label and still be able to read the code recorded thereon.

Figure 1:
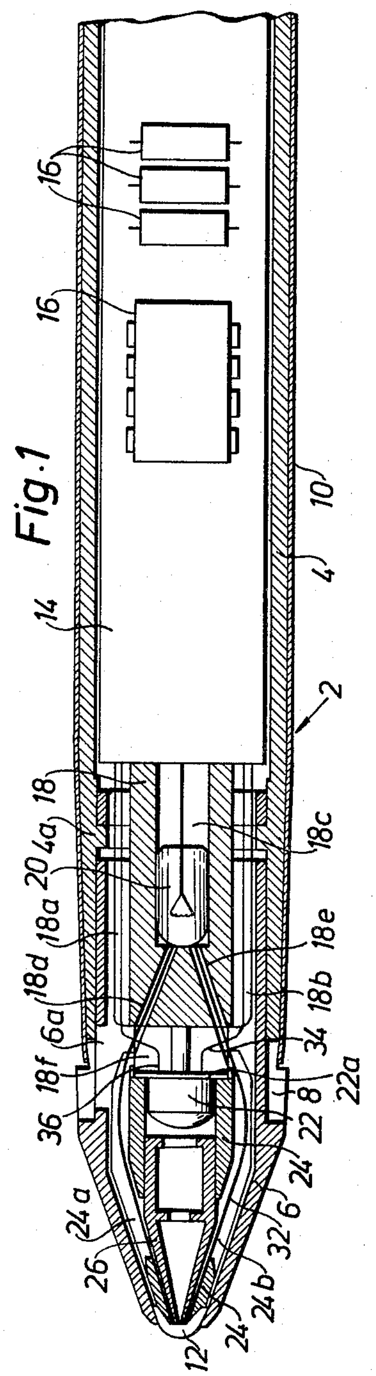
FIG. 1 is a sectional view of a handheld reading device in accordance with the invention, wherein the upper part of the device has been deleted for the sake of clarify.
Figure 2:
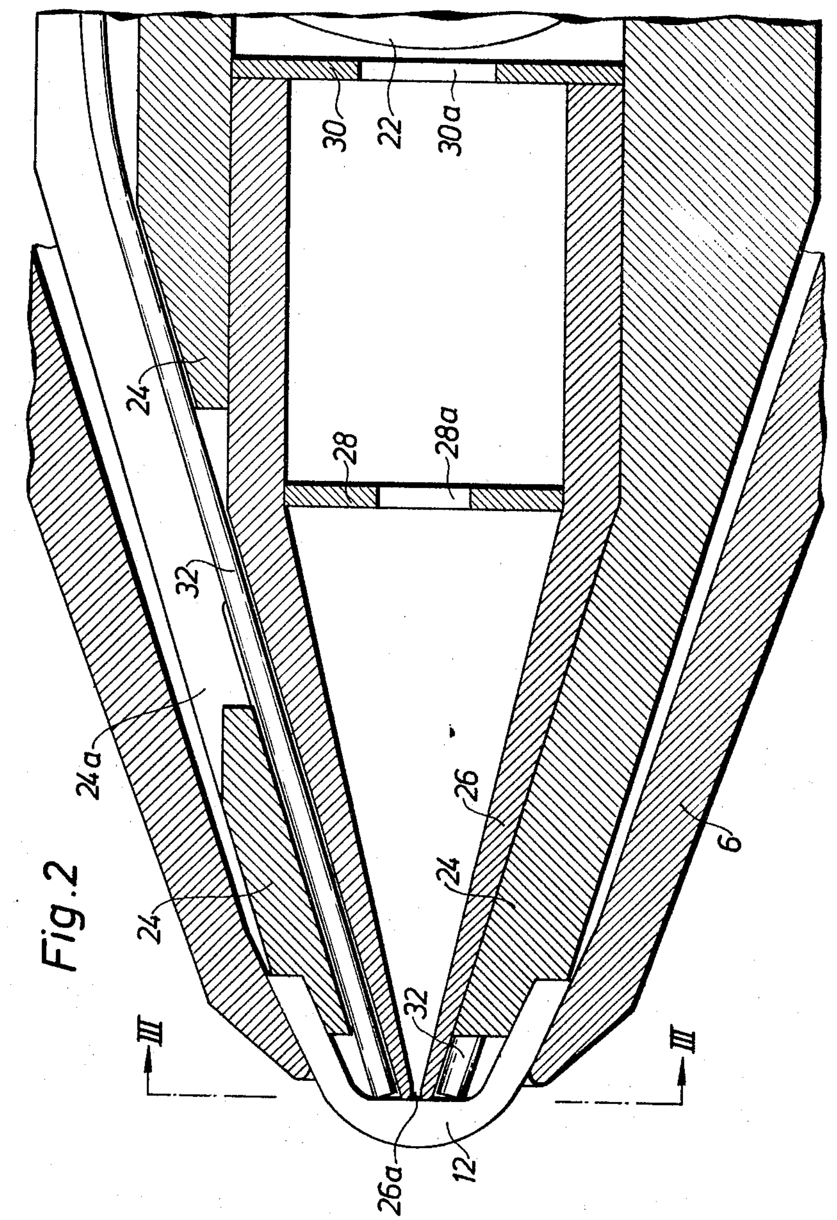
FIG. 2 is an enlarged view in section of the end of the reading device which is intended to contact a data record.

The reading device, which is designated with the reference symbol 2 in FIG. 1, comprises an other, tubular, plastic casing 4 which - in combination with a conical steel casing 6, including a number of big slots along its periphery (one, 6*a*, is shown) - encloses the components of the device. Casing 4 is provided with a ring-formed, inner flange 4*a* which locks casing 4 to casing 6. Between casings 4 and 6 there is a plastic ring 8 the function of which will be described more fully below. A close-fitting plastic tube 10 covers casing 4 and a part of ring 8 and causes casings 4 and 6 and ring 8 to steadily remain in the desired relationship. In the tip of casing 4 there is a transparent, cup-formed body 12 which may be a sapphire or similar. Body 12 is not fastened to the inner wall of casing 6 but is pressed against this wall by means of a spring which affects all components within casing 4 and 6. This spring (not shown) is arranged in the upper part of casing 4, i.e., to the very right in FIG. 1, and presses against a circuit board 14 extending essentially along the whole length of casing 4 and tube 10. Circuit board 14, on which components constituting an amplifier and other circuits essential for the function of the device are soldered, presses against a lamp holder 18 of translucent plastic. Lamp holder 18, which is cylindrical, is provided with two grooves 18*a* and 18*b* extending in the longitudinal direction of casing 4 and is also provided with a cylindrical cavity 18*c* wherein there is a lamp 20. Further, seven channels (two are shown 18*d* and 18*e*) have been drilled in holder 18, these channels diverge from lamp 20. The part of holder 18 which is turned against body 12 is provided with a cruciform part 18*f* which presses against flange 22*a* on a photo element 22 which in its turn presses against a conical holder 24 wherein said element is situated. Holder 24, which can be manufactured from brass, for instance, is provided with seven longitudinal slots two of which, 24*a* and 24*b*, are shown in FIG. 1 and one of which 24*a*, is shown in FIG. 2. The part of holder 24 which is turned against body 12 presses the body against the circular, inner wall of casing 6. By means of glue, for instance, an aperture means 26, preferably made from brass, has been fastened in holder 24. Aperture means 26 is provided with a circular opening 26*a* the diameter of which essentially corresponds to the width of a marking on the label to be read. Opening 26*a* is in contact with the planar, inner part of body 12 and is situated along the longitudinal center axis of the reading device 2. Aperture means 26 is conical and apertures in the form of washers 28 and 30 with circular holes therein are fastened to the means in order to limit and define the light to the photo element and to prevent undesireable reflections from reaching it. It is evident from FIG. 2 that hole or opening 28*a* in washer 28 has a diameter which is considerably greater than that of opening 26*a* but is somewhat less than the diameter of opening 30*a* in washer 30. Instead of being provided with separate washers 28 and 30 aperture means 26 can be manufactured from one single piece.

Figure 3:
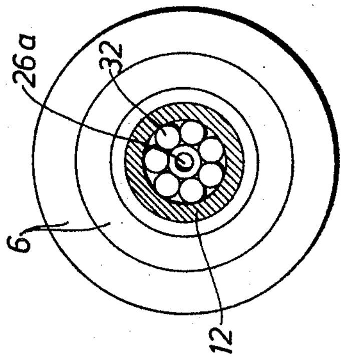
FIG. 3 is a sectional view along line III—III in FIG. 2 on a reduced scale.

Between aperture means 26 and holder 24 seven light conducting fibers 32 are symmetrically arranged (see FIG. 3). The ends of fibers 32 which are turned against body 12 are in contact with this body. The fibers, which are maintained in place by the pressure between holder 24 and aperture means 26 extend through slots 24*a*, 24*b*, etc. Secure mounting of fibers 32 is also obtained by their insertion in channels 18*d*, 18*e*, etc. in holder 18. The ends of fibers 32 which are turned from body 12 make contact with lamp 20 and are directed towards its filament.

Transparent body 12 has several functions. For instance, it protects fibers 32 and opening 26*a* against blows and impacts, it prevents dirt from penetrating into the reading device 2 and it supports the ends of fibers 32 facing body 12. At an impact against body 12 in the longitudinal direction of the reading device 2 body 12 and the other components within the reading device will resiliently move to the right in FIG. 1 due to the compression spring being located in the back of the reading device. Consequently, risks for damaging these components are eliminated.

Transparent ring 8 between casings 4 and 6 functions as an indicator indicating whether lamp 20 is switched on and reading can take place. Light emitted from lamp 20 is namely sent through the transparent holder 18, via slots 6*a*, etc. in casing 6, to ring 8 which may contain a suitable fluorescent material which then will shine with a certain colour when lamp 20 is switched on.

During the reading of markings on a data record, such as a price label, reading device 2 is manually moved over the label in contact therewith or is moved at a distance from the label. The markings may consist of black bars each one having a width of 0.1 mm approximately. Light emitted from lamp is conducted by light fibers 32 which illuminate an essentially circular area on the label. The diameter of this area considerably exceeds the width of a black bar. A certain quantity of light reflected from the label is received by opening 26*a*. Since opening 26*a*, having a diameter of 0.1 mm, does not extend more than approximately 0.1 mm in the longitudinal direction of the reading device the luminous flux passing through said opening will originate from a circular area on a data record being in contact with body 12, the diameter of this area somewhat exceeds 0.1 mm, i.e., the light rays somewhat diverge from opening 26*a* to photo element 22. In order to obtain maximal resolution opening 30*a* would have the same size as opening 26*a*, and circular areas having diameters of exactly 0.1 mm could then be read. However, since presently used photo elements are not that sensitive that they are able to detect the small luminous flux which in such a case would reach the photo element the compromise has been made according to the invention that the opening 30*a* adjacent photo element 22 exceeds opening 26*a* resulting in a somewhat greater flux reaching the photo element. This flux is sufficient in order that the photo element shall get wide margins for the detection. However, opening 30*a* still is so small that the luminous beam received by element 22 diverges very little, i.e., a very good resolution is obtained. Thus, light passing through opening 26*a* is transmitted to apertures 28 and 30 through the openings 28*a* and 30*a* through which a portion of the light coming from opening 26*a* is passing. Light falling on the inner walls of aperture means 26 is reflected by these walls but is prevented from reaching photo element 22 due to apertures 28 and 30. The changes in luminous flux detected by photo element 22 are converted therein to electrical signals which are transmitted to the components 16 soldered on circuit board 14 via leads 34 and 36 running in grooves 18*a* and 18*b* in lamp holder 18.

An embodiment of the invention has been described above. However, it should be understood that several modifications thereof can be made without setting aside the idea of the invention. Therefore, the invention is only limited to what is stated in the appended claims.

I claim:

1. Handheld reading device for optical reading of markings on a data record, comprising a light-proof casing having an opening therein facing the data record, light from light source means within or outside the casing being transmitted to the data record through said opening and light reflected from the data record being transmitted back through said opening to light receiving means within said casing, characterized in that between said opening and said light receiving means there are at least two apertures a first of which being arranged adjacent to said opening and having a size which is less than the opening, and a second of which being arranged between the first aperture and the light receiving means and having a size which exceeds the size of the first aperture, but is less than the sectional area limited by the inner surfaces of the walls surrounding the apertures at least at some location between the apertures, and that the light beam remains unrefracted from said first aperture to said light receiving means.

2. Reading device according to claim 1, characterized in that said apertures are arranged on one single means.

3. Reading device according to claim 2, characterized in that said aperture means consists of a closed chamber, two of its sides being located opposite to each other having said first and second apertures therein.

4. Reading device according to claim 1, characterized by a third aperture between said first and second apertures which has a size exceeding the size of the first aperture but being less than the size of the second aperture.

5. Reading device according to claim 1, characterized in that said opening in said casing, apertures and said light receiving meaans are arranged essentially along the longitudinal, center axis of said casing.

6. Reading device according to claim 1, characterized in that said opening in said casing and said apertures are circular.

7. Reading device according to claim 1, characterized by a transparent body in said opening of said casing.

8. Reading device according to claim 1, characterized by at least one light source in said casing and by one or more light conductors extending from said lamp to a region in the vicinity of said opening of said casing.

9. Reading device according to claim 8, characterized in that said means provided with apertures and the ends of said light conductors are in abutting relationship with a transparent body in said opening of said casing.

10. Reading device according to claim 1, characterized in that said light receiving means consists of a light sensitive element.

11. Reading device according to claim 9, characterized in that said light receiving means includes one end of at least one light conductor the other end of which being located in proximity to a light sensitive element within or outside said casing.

* * * * *